United States Patent
Hailesilassie

(10) Patent No.: US 12,031,855 B2
(45) Date of Patent: Jul. 9, 2024

(54) CALIBRATION OF A WIM SENSOR

(71) Applicant: Kistler Holding AG, Winterthur (CH)

(72) Inventor: Biruk Hailesilassie, Urdorf (CH)

(73) Assignee: Kistler Holding AG, Winterthur (CH)

( * ) Notice: Subject to any disclaimer, the term of this patent is extended or adjusted under 35 U.S.C. 154(b) by 532 days.

(21) Appl. No.: 17/296,650

(22) PCT Filed: Dec. 4, 2019

(86) PCT No.: PCT/EP2019/083646
§ 371 (c)(1),
(2) Date: May 25, 2021

(87) PCT Pub. No.: WO2020/120253
PCT Pub. Date: Jun. 18, 2020

(65) Prior Publication Data
US 2022/0026262 A1    Jan. 27, 2022

(30) Foreign Application Priority Data

Dec. 14, 2018    (EP) .................................... 18212704

(51) Int. Cl.
*G01G 23/01* (2006.01)
*G01G 19/02* (2006.01)
(Continued)

(52) U.S. Cl.
CPC ............ *G01G 23/01* (2013.01); *G01G 19/022* (2013.01); *G01L 17/00* (2013.01);
(Continued)

(58) Field of Classification Search
CPC .... G01G 23/01; G01G 19/022; G01G 23/012; G01G 19/024; G01L 17/00; G01L 19/0092; G01P 15/00; G01S 19/01
(Continued)

(56) References Cited

U.S. PATENT DOCUMENTS 5,973,273 A    10/1999  Tal et al.
6,161,431 A *  12/2000  Drahne .................. G01P 15/165
                                                           73/146
(Continued)

FOREIGN PATENT DOCUMENTS

CA       2625269 A1     6/2009
CN    101893472 A      11/2010
(Continued)

OTHER PUBLICATIONS

JP Office Action with Translation, dated May 12, 2022, 9 pages.
(Continued)

*Primary Examiner* — Jacques M Saint Surin
(74) *Attorney, Agent, or Firm* — Dority & Manning, P.A.

(57) ABSTRACT

A method to calibrate a Weigh in Motion (WIM) sensor that is arranged in a road flush with a road surface for determining a force exerted on the road surface by a vehicle's wheel transgressing the WIM sensor uses an evaluation unit that calculates the wheel force upon receiving the vehicle's velocity and a distance signal from a first device fixed on the vehicle and coordinates the wheel force with a synchronized signal from the WIM sensor to generate a calibrate function for the WIM sensor. The evaluation unit continuously adjusts the wheel force to take into account one or more of wheel pressure, wheel temperature, wheel tilt and vehicle acceleration. A system employing the method includes the vehicle, the evaluation unit, the first device, a synchronization device such as a GPS unit, and sensors for one or more of pressure, temperature, tilt and acceleration.

14 Claims, 5 Drawing Sheets

(51) Int. Cl.
   *G01L 17/00*     (2006.01)
   *G01L 19/00*     (2006.01)
   *G01P 15/00*     (2006.01)
   *G01S 19/01*     (2010.01)

(52) U.S. Cl.
   CPC .......... *G01L 19/0092* (2013.01); *G01P 15/00* (2013.01); *G01S 19/01* (2013.01)

(58) Field of Classification Search
   USPC .......................................................... 177/1
   See application file for complete search history.

(56)      References Cited

U.S. PATENT DOCUMENTS

| | | | |
|---|---|---|---|
| 7,000,462 B2* | 2/2006 | Hillenmayer | B60C 23/0488 73/146.5 |
| 8,064,047 B2 | 11/2011 | Puellen et al. | |
| 8,165,842 B2* | 4/2012 | Helck | B60T 8/172 702/148 |
| 9,804,017 B2* | 10/2017 | Cornu | G01G 19/022 |
| 9,851,241 B2 | 12/2017 | Hofmann et al. | |
| 10,640,936 B2* | 5/2020 | Simons | E01C 11/005 |
| 10,801,881 B2* | 10/2020 | Wuhrmann | G01G 19/024 |
| 10,809,120 B2* | 10/2020 | Minkoley | G01G 3/13 |
| 10,921,176 B2* | 2/2021 | Ribi | G01L 1/04 |
| 2009/0151421 A1 | 6/2009 | Susor | |
| 2013/0024152 A1 | 1/2013 | Hofmann et al. | |
| 2013/0125639 A1 | 5/2013 | Lemineur | |

FOREIGN PATENT DOCUMENTS

| | | |
|---|---|---|
| CN | 102834700 A | 12/2012 |
| CN | 102901550 A | 1/2013 |
| CN | 103076074 A | 5/2013 |
| CN | 103852148 A | 6/2014 |
| CN | 203981255 U | 12/2014 |
| CN | 104949746 A | 9/2015 |
| DE | 102017207559 | 2/2018 |
| EP | 2026048 A1 | 2/2009 |
| JP | H06-147963 A | 5/1994 |
| JP | H 10-054751 A | 2/1998 |
| JP | 2007-514176 A | 5/2007 |
| JP | 2007-240392 A | 9/2007 |
| JP | 2010-066261 A | 3/2010 |
| JP | 2013-524172 A | 6/2013 |
| WO | WO 99/45346 | 9/1999 |
| WO | WO 2011120176 A1 | 10/2011 |

OTHER PUBLICATIONS

International Search Report dated Feb. 27, 2020, 3 pages.
Written Opinion of International Searching Authority dated Feb. 27, 2020, 4 pages.
The First Office Action with English translation for CN application No. 201980083051.6, dated Aug. 19, 2022, 20 pages.
CN Search Report for CN application No. 201980083051.6, 4 pages.

* cited by examiner

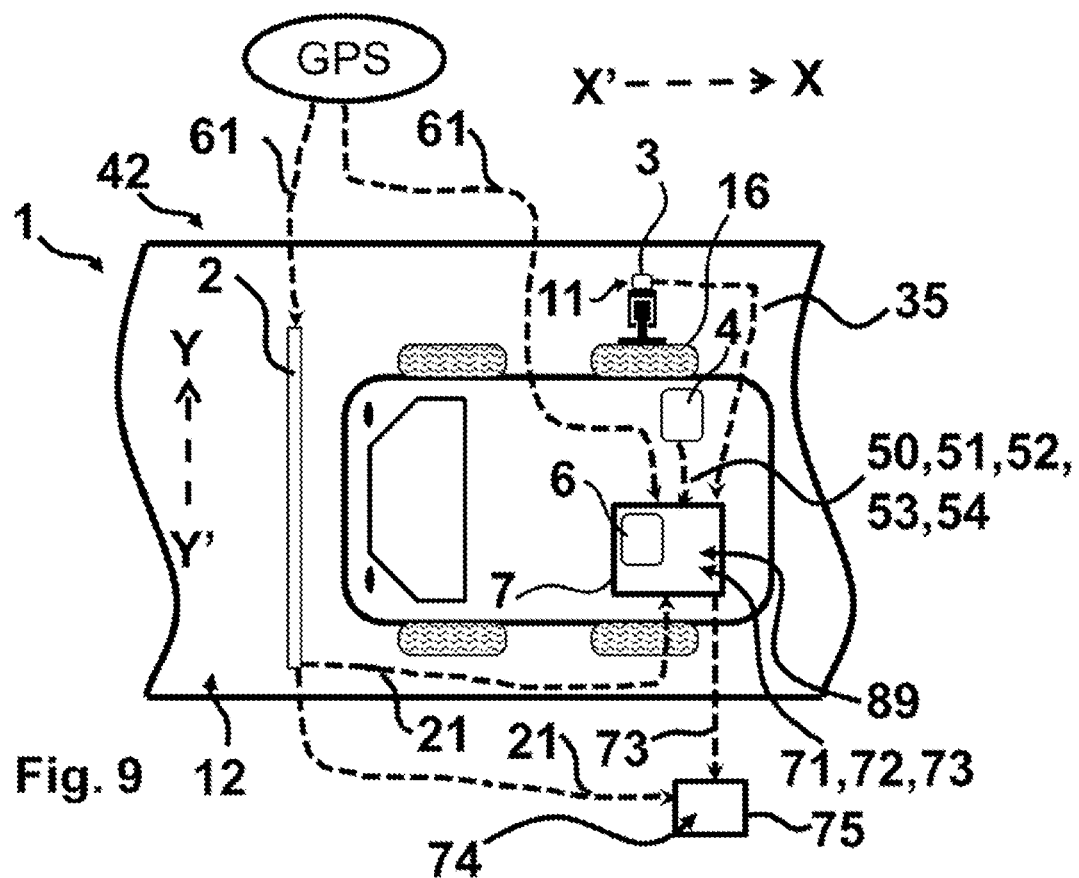

CALIBRATION OF A WIM SENSOR

CROSS-REFERENCE TO RELATED APPLICATIONS

The present application claims priority to patent application serial number PCT/EP2019/083646, filed on Dec. 4, 2019, which patent application is hereby incorporated herein in its entirety by this reference for all purposes.

FIELD OF THE INVENTION

The invention relates to a method to calibrate a Weigh in Motion (WIM) Sensor. The invention also relates to a system used to calibrate the WIM Sensor.

BACKGROUND OF THE INVENTION

WIM sensors measure forces that a vehicle exerts on a surface of a section of a road by the wheels of the vehicle while driving on the section of the road. For the sake of simplicity, section of the road will be referred to just as road. Such WIM sensors are often used in a WIM system having at least one WIM sensor. Furthermore, a WIM system may have at least one additional sensor for vehicle identification, velocity measurement or measurement of environmental factors. A WIM sensor is arranged in the road flush with the surface of the road in such a way that at least one wheel of a vehicle driving on the road moves across the WIM sensor.

WIM sensors are often used to determine a wheel force or an axle force or the total weight of a vehicle. The wheel force corresponds to a proportion of the total weight of a vehicle that exerts on the road surface by the wheel. The axle force is the sum of all wheel forces of the wheels of an axle. The total weight is the sum of all axle forces of all axles of the vehicle. If a force exerts on a WIM sensor arranged in the road, measurement elements arranged in the WIM sensor are providing a WIM signal proportional to the force exerted on the road. In order to determine the wheel force exerted on the WIM sensor arranged in the road, the WIM signal needs to be calibrated. The calibrated measurement element signal is referred to as calibrated WIM force signal. The calibration of the WIM signal arranged in the WIM sensor is for the sake of simplicity referred to as calibration of the WIM sensor.

Providing a signal refers to the signal being available for further use. Providing a signal also includes storing the signal in an electronic memory and loading the signal from said memory. Providing a signal also includes displaying the signal on a display unit.

A method to calibrate a WIM sensor is described in WO2011120176A1, which corresponds to US Patent Application Publication No. 2013-0024152 that is hereby incorporated herein in its entirety by this reference for all purposes, where a calibrating vehicle which is equipped with a rotating wheel force dynamometer which rotates with the hub passes over a WIM sensor arranged in the road. The dynamic wheel force on the road and on the WIM sensor is measured during travel directly with the wheel force dynamometer and transmitted to an evaluating unit. The WIM sensor measures the WIM signal as the calibrating vehicle passes over the WIM sensor and the WIM signal is transmitted to the evaluating unit and synchronized with the dynamic wheel force measured by the wheel force dynamometer. On the basis of the comparison of the wheel force data with the WIM signal data, a calibration function is determined and used for the calibration of the WIM sensor.

The term "dynamic" refers to a "time dependent change". A dynamic wheel force is a wheel force changing over time, for example due to a swinging of the body mass of the vehicle, which is connected to the wheel via a wheel suspension. The body mass is the mass of the body of a vehicle. The body of the vehicle comprises all parts of the vehicle excluding wheels and wheel suspension. For example the engine, the chassis, one or more persons if applicable, and freight if applicable, are part of the body mass.

A swinging of the body mass can be caused by a previous unevenness in the road surface. A swinging is a temporal change of a distance, for example the distance of the body to the road. Another example causing the wheel force to change dynamically is an acceleration or deceleration of the vehicle. Thus, a force acting on the road surface though the wheel may not only be caused by the proportion of the total weight of the vehicle but also by the acceleration of a moving body mass.

While the method to calibrate a WIM sensor described in WO2011120176A1 is more effective than determining the static weight of a vehicle and comparing the WIM signal with the static weight to determine a calibration function, the method is expensive and complex as a complete wheel of the measurement vehicle has to be replaced with a wheel with a rotating wheel force dynamometer. Furthermore, the rotating wheel force dynamometer is quite expensive.

OBJECTS AND SUMMARY OF THE INVENTION

The task of the invention is to establish an easy and cost effective method to calibrate a WIM sensor. An additional task of the invention is to measure the dynamic wheel force of a vehicle in an easy and cost effective way.

At least one of the tasks is solved by the features described below. The invention relates to a method to calibrate a WIM (Weigh in Motion) sensor; which WIM sensor is arranged in a road flush with a road surface; which WIM sensor determines a force exerted on the road surface and provides the force determined as a calibrated WIM force signal; characterized in that the following steps are performed:

a) A device is arranged at a position of a vehicle; the position having a distance to the road surface; the device being configured to measure the distance to the road surface.

b) The vehicle passes over the WIM sensor exerting a force on the road surface and the WIM sensor, which generates a WIM signal; the vehicle being equipped with at least one sensor arranged at the vehicle; the sensor measuring a continuously and providing a measurand signal to an evaluation unit; at least one sensor is configured to measure the velocity of the vehicle as a measurand signal and providing a velocity signal to the evaluation unit; the device from step a) measuring the distance to the road surface continuously and providing the distance signal to the evaluation unit.

c) The evaluation unit calculates the force exerted on the road surface continuously; the force being dependent on the at least one sensor signal and the distance signal provided in step b) to the evaluation unit; the evaluation unit provides the force as a calculated wheel force signal.

d) The WIM sensor provides the WIM signal to the evaluation unit as the vehicle passes over the WIM sensor.

e) The evaluation unit determines a calibration function based on the calculated wheel force signal of the force exerted on the road surface and the WIM signal.

f) The calibration function is used for the calibration of the WIM sensor.

The road surface defines two directions being parallel to it: the longitudinal direction and the lateral direction. The longitudinal direction is the direction vehicles are moving on a road. The lateral direction is perpendicular to the longitudinal direction. The lateral direction defines a lateral axis being parallel to the lateral direction. The longitudinal direction defines a longitudinal axis being parallel to the longitudinal direction.

A third direction is given by the vertical direction. The vertical direction is perpendicular to the lateral direction. The vertical direction is perpendicular to the longitudinal direction. The vertical direction defines a vertical axis being parallel to the vertical direction.

As the directions are defined relative to the road surface, the direction of gravitational force is not necessarily parallel to the vertical direction, for example on an incline of the road.

A vehicle comprises at least two wheels, which wheels are connected to a body mass by means of a wheel suspension. The body mass comprises the combined masses of all parts of the vehicle excluding wheels and wheel suspension. For example the masses of the engine, the chassis, one or more persons if applicable, and freight if applicable, are part of the body mass. The suspension comprises a spring element and a damping element. The wheel comprises a running surface which is in contact with the road surface, the so-called contact area. Furthermore, the wheel comprises a wheel hub, the wheel hub being the centre of rotation of the wheel while driving across the road surface and the wheel hub being connected rotatably with respect to the wheel suspension. The running surface is part of a usually elastic element of the wheel, for example a gas-filled element in case of a gas-filled wheel, or a rubber element in case of a full-cushion wheel. The wheel therefore shows a spring like and a dampening behaviour.

Despite suspension of the wheel, the body mass shows a swinging when the wheel is driving across an uneven surface. The swinging of the body mass influences the wheel force that the wheel exerts onto the road surface. If the body mass is swinging while driving across a WIM sensor being arranged in the road, then the wheel force or axle force is not corresponding only to the weight of the vehicle.

In order to determine the wheel force exerted on a WIM sensor arranged in the road, the temporal change of the wheel force, which is the so called dynamic wheel force, has to be determined at the position on the road surface the WIM sensor is arranged at. The wheel force determined at the position of the WIM sensor is used to calibrate the WIM sensor.

The wheel force is determined by calculation based on the distance of a device arranged at a position of the vehicle to the road surface; the device being configured to measure the distance to the road surface. The device is in indirect contact with the road surface though elements of the vehicle, showing a spring like behaviour and a dampening behaviour. The elements arranged between the device and the road surface therefore are referred to as a spring element having a spring constant. Despite the term 'constant', a spring constant may be depending on one or more physical quantities and may therefore change if one physical quantity changes, for example a temperature and/or a velocity and/or a pressure.

At least the spring constant is depending on the velocity signal. With the spring constant known, the wheel force is determined directly by the dependence of the length of a spring element from the force exerted on the spring element. In a linear approximation, this is generally known as Hooke's equation. The force exerted on the spring element is equal to the wheel force exerted on the road surface.

The dynamic wheel force is calculated from the known velocity dependent spring constant and the measured distance of the device to the road surface and the measured velocity of the vehicle.

Measuring the distance of the device to the road surface, the velocity of the vehicle and the WIM signal simultaneously allows determining the calibration function for the WIM sensor. The calibration function is used for the calibration of the WIM sensor. The calibrated WIM force signal is calculated by the evaluation unit from the WIM signal using the calibration function.

Since the method to obtain the calibration function does not involve the time consuming change of a wheel of a vehicle, it is easy to use. And since devices configured to measure distances and sensors measuring velocity are not expensive when compared to the cost of wheel dynamometers, the method is very cost effective.

BRIEF DESCRIPTION OF THE DRAWINGS

The drawings used to explain the embodiments show:

FIG. 9 is a schematic representation of a section of a road viewed from above the road and showing a synchronization device in the evaluation unit.

DETAILED DESCRIPTION OF EXEMPLARY EMBODIMENTS

Figure 1:
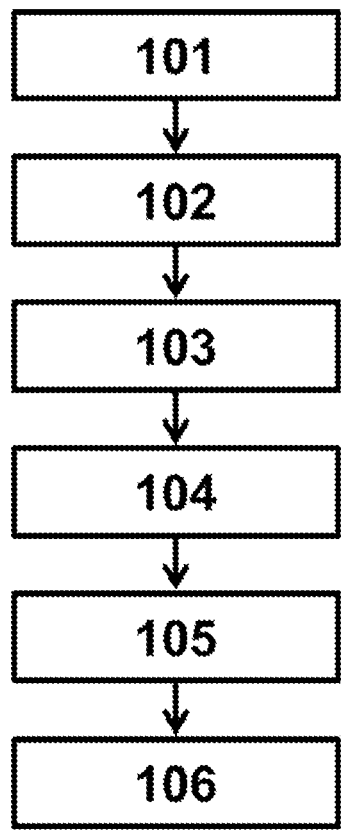
FIG. 1 a flow chart illustration of the method to calibrate a WIM sensor.
Figure 8:
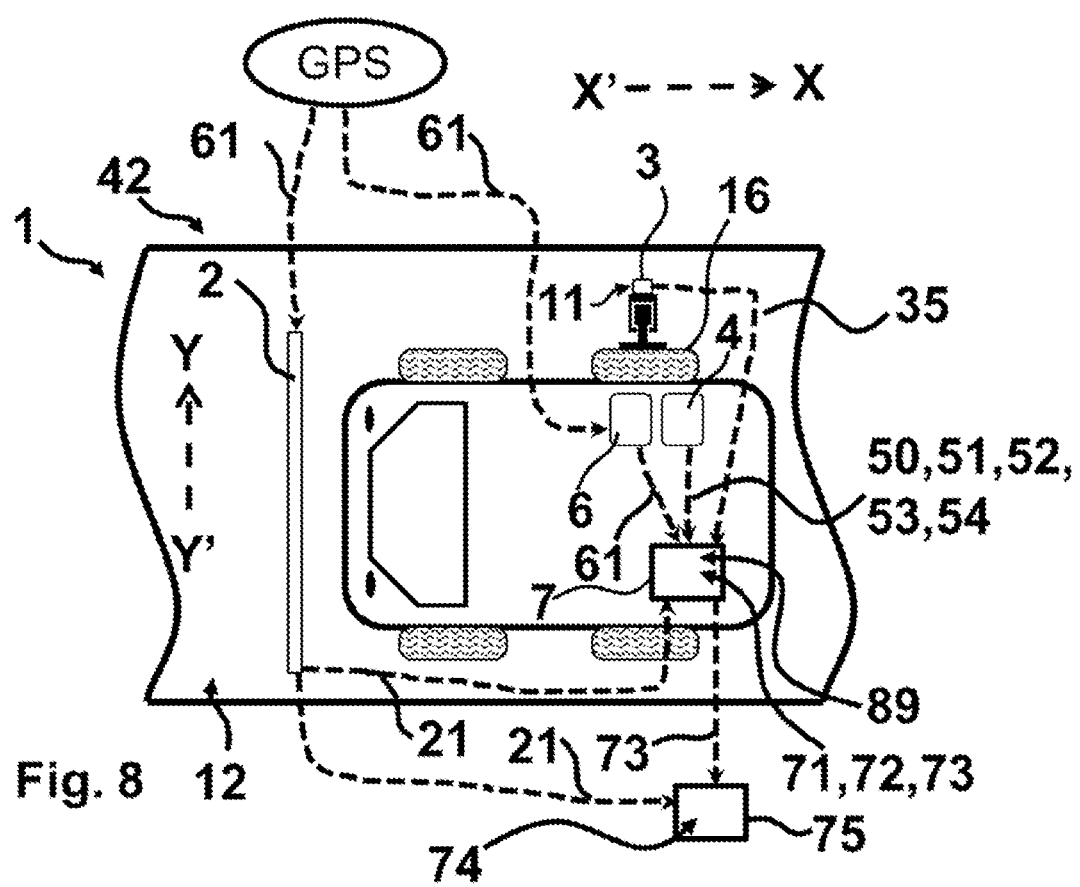

FIG. 1 shows an illustration of the steps of a method for calibrating a WIM sensor 2 arranged in a road 1 as schematically shown in FIG. 8, the method including step a) 101, step b) 102, step c) 103, step d) 104, step e) 105 and step f) 106 as described below.

The invention relates to a method to calibrate a WIM (Weigh in Motion) sensor 2; which WIM sensor 2 is arranged in a road 1 flush with a road surface 12 as shown in FIG. 8. The WIM sensor 2 determines a force exerted on the road surface 12. Furthermore, an evaluation unit 7 is provided and equipped with a calibration function 73. In order to calibrate a WIM sensor 2 the calibration function 73 is used. The calibration function is used to calculate the calibrated WIM force signal 74 from an uncalibrated WIM signal 21. Determining the calibration function is done by following steps a) to f) described in the following.

Figure 6:
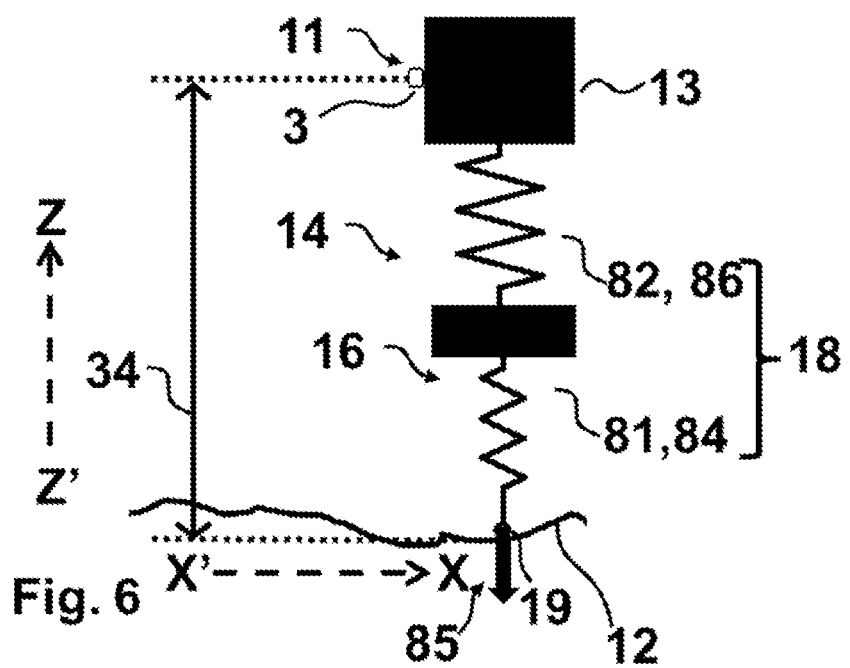
Figure 7:
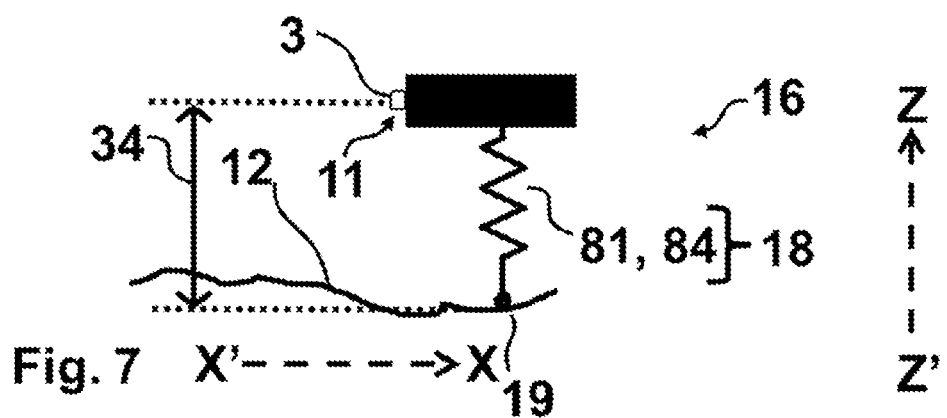

In step a) 101, a device (3) is arranged at a position (11) of a vehicle (10), as shown in FIG. 2 to FIG. 5 for exemplary embodiments of the vehicle 10 used in the method; the position having a distance (34) to the road surface (12) schematically depicted in FIG. 6 and FIG. 7; the device (3) being configured to measure the distance (34) to the road surface (12) continuously; the device (3) providing a distance signal (35) schematically depicted in FIG. 8 to the evaluation unit (7). This device 3 may for example be a laser distance sensor, and Kistler Type CHFA Optical laser heightsensors can be used in an exemplary embodiment of the vehicle 10 used in the method.

In step b) 102, a wheel (16) of the vehicle (10) passes over the WIM sensor (2), the wheel (16) exerting a force (85) on the road surface (12) and the WIM sensor (2); the vehicle (10) being equipped with at least one sensor (4) arranged at the vehicle (10); said at least one sensor (4) is configured to measure the velocity of the vehicle as a velocity signal and providing a velocity signal (50) schematically depicted in FIG. 8 to the evaluation unit (7). The said at least one sensor 4 configured to measure the velocity of the vehicle as a velocity signal 50 may be a member of the Correvit product line of Kistler Company, for example a Kistler Type 5335A velocity sensor that employs a technique similar to that described in applicant's U.S. Pat. No. 8,064,047, which is hereby incorporated herein in its entirety by this reference for all purposes.

The evaluation unit 7 may be an electronic computing device or a similar electronic device able to perform algorithms on signals 50, 51, 52, 53, 54, 21, 35 provided, as shown in FIG. 8. The evaluation unit 7 may have a non-volatile memory, in which algorithms are stored, and a processing unit, which may load the algorithm from the non-volatile memory and performs arithmetic processes on signals 50, 51, 52, 53, 54, 21, 35 provided according to the algorithm.

Said at least one sensor 4 determines the velocity of the vehicle 10 continuously during passage of the WIM sensor 2 by the vehicle 10, which velocity of the vehicle 10 has an influence on the wheel spring constant 84 of the spring element 18 schematically shown in FIG. 6 and FIG. 7.

Depending on the position 11 of the device 3, the spring element 18 consists of different components of a vehicle 10, namely all elements arranged in between the device 3 and the contact area 19 between vehicle 10 and road surface 12, as shown in FIG. 2 to FIG. 5. However, one element of the before mentioned is a wheel 16 of a vehicle 10, having a wheel spring element 81 with a wheel spring constant 84 schematically shown in FIG. 6 and FIG. 7. The rotating velocity of a wheel 16, which is directly linked to the velocity of the vehicle 10, has a direct influence on the wheel spring constant 84. Therefore, the velocity signal 50 is measured continuously and provided to the evaluation unit 7.

The term "continuously" with respect to a measurement has the meaning "repeatedly acquiring a measurand, like velocity, temperature, pressure, with a repetition frequency higher than an expected change in the measurand". The repetition frequency may depend on the measurand. A temperature or a pressure is for example changing slowly within this application. Thus, in case a temperature or a pressure is measured, the repetition frequency may be as slow as 100 mHz (1 mHz=0.001 Hz), or preferably higher than 1 Hz. The velocity of the vehicle 10 however may change at a much higher rate, rendering the repetition frequency of a velocity measurement to at least 10 mHz necessary, or preferably higher 100 Hz and up to 50 kHz (1 kHz=1000 Hz).

In step c) 103, the evaluation unit 7 uses the velocity signal 50 and the distance signal 35 to calculate a wheel force 71 exerted on the road surface 12 continuously and provides the calculated wheel force 71 as a calculated wheel force signal 72, as shown in FIG. 8.

The calculation of the calculated wheel force 71 is performed with an algorithm in the evaluation unit 7.

In step d) 104, The WIM sensor 2 provides a WIM signal 21 to the evaluation unit 7 as the vehicle passes over the WIM sensor 2. The wheel 16 of the vehicle 10 passing over the WIM sensor 2 exerts a wheel force 85 on the WIM sensor 2 arranged in the road 1. The WIM sensor 2 determines the wheel force 85 and provides the WIM signal 21, which is not yet calibrated. It is advantageous that the wheel force 85 is exerted on the WIM sensor 2 by the same wheel 16 the calculated wheel force 71 is calculated for by the evaluation unit 7.

In step e) 105, the evaluation unit 7 uses the calculated wheel force signal 72 and the WIM signal 21 to determine a calibration function 73. To do this, the evaluation unit 7 compares the WIM signal 21 to the calculated wheel force signal 72. The calibration function 73 is generated such that it will give the calibrated WIM force signal 74 as output of the calibration function 73 for an input of the WIM signal 21. The calibration function 73 is provided by the evaluation unit 7 for further usage. The generation of the calibration function 73 is therefore easy reliable and straightforward. Furthermore, the method to generate the calibration function 73 can be done with every vehicle 10 without the need to change a wheel 16. It is also not necessary to have the right size wheel force dynamometer for a wheel type of a vehicle 10, as the device 3 is simply attached to existing positions of the vehicle 10.

In step f) 106, the calibration function 73 is used for the calibration of the WIM sensor 2. For this, the calibration function 73 is stored in a non-volatile memory of a calibration unit 75. The calibration unit 75 is arranged inside WIM sensor 2 or the calibration unit 75 is arranged close to the WIM sensor 2 at the side of the road, as shown in FIG. 8. The WIM sensors 2 calibration unit 75 is configured to provide the calibrated WIM force signal 74 of a WIM sensor 2 upon exertion of a wheel force 85 to the WIM sensor 2 after calibration of the WIM sensor 2. As the method is fast and easy to perform and every vehicle 10 can be used without the need for a costly exchange of the wheels 16 of the vehicle 10, calibration of the WIM sensor 2 is very cost efficient. This allows for a more frequent calibration interval, which is beneficial for the accuracy of the weight measurement of the WIM sensor 2.

In one embodiment of the method, in step c) 103 the evaluation unit 7 uses the distance signal 35 and a wheel spring constant 84 to calculate the wheel force 71. This is beneficial, as determining a distance 34 is readily achieved and cost efficient compared to determining a force directly.

The algorithm in the evaluation unit 7 to calculate the wheel force 71 is based on the dependence between the length of a spring element 18 with its known relevant spring constant and the force exerted on the spring element 18 in the form $F=kX$. The length or the change in length (X) of the spring element 18 is measured by the device 3 and provided to the evaluation unit 7 through the distance signal 35. The relevant spring constant (k) of the spring element 18 is determined as described below.

The relevant spring constants for the spring element 18 are the wheel spring constant 84 and, if the distance signal is depending on the suspension 14, then the suspension spring constant. Wheel spring constant 84 and suspension spring constant 86 can be combined per definition in form of the reciprocal of the sum of the reciprocals of the spring constants. All elements of the vehicle 10 arranged in between the device 3 and the contact area 19 of the vehicle 10 and the road surface 12 should be taken into account, as shown in FIG. 6 and FIG. 7 for the exemplary embodiments of the vehicle 10 shown in FIG. 2 to FIG. 5. The contact area 19 is usually the area of the wheel 16 that is in contact with the road surface 12. In good approximation, only terms of the sum having a small spring constant contribute significantly. Therefore, only terms are taken into accounts account which contribute more than 10% to said reciprocal of the sum. For a device 3 arranged at a position at the vehicle 10, the wheel spring constant 84 is taken into account. If the suspension 14 between wheel 16 and the body 13 of the vehicle 10 is arranged in between the contact area 19 and the device 3 as well, then the suspension spring element 82 with its suspension spring constant 86 is taken into account as well, as is shown in FIG. 7.

In one embodiment of the method schematically shown in FIG. 7, only the wheel spring element 81 is arranged in between the contact area 19 and the device 3. The wheel force 71 is calculated by a function of the type $$F=k(z1-z0)+c,$$

with the calculated wheel force F designated 71 in FIG. 8, the distance (z1-z0) designated 34 in FIGS. 6 and 7, the wheel spring constant k designated 84 in FIGS. 6 and 7 and a constant value c. The road surface 12 is located at z0 and the device 3 at z1 on the vertical axis Z'Z. The summand c is a constant taking into account the dimension of the vehicle 10. In this embodiment of the method, this calculation of the calculated wheel force 71 is readily performed and therefore is beneficial as the distance signal 35 only depends on the wheel spring constant 84 and is independent from the suspension spring constant 86.

In another embodiment of the method schematically shown in FIGS. 6 and 8, in step c) the evaluation unit 7 uses the distance signal 35 and a wheel spring constant 84 and a suspension spring constant 86 to calculate the wheel force 71. This configuration allows the device 3 to be arranged at a position 11 at the body 13 of the vehicle 10, which gives more freedom for a convenient positioning of the device 3.

In case the suspension spring element 82 and the wheel spring element 81 are arranged in between the contact area 19 and the device 3, the wheel force (71) is calculated by a function of the type $F=(k1^{-1}+k2^{-1})^{-1}$ (z1-z0)+c, with the calculated wheel force F 71, the distance (z1-z0) 34, the wheel spring constant k1 84, the suspension spring constant k2 86 and a constant value c. The summand c is a constant taking into account the dimension of the vehicle 10.

In one embodiment of the method, the distance signal (35) and the WIM signal (21) in step e) are synchronized with respect to at least one of a time or a location of the wheel (16); and that said time or said location of the wheel (16) is provided to the evaluation unit as a synchronization signal (61), as shown in FIG. 8. This ensures that the calibration function 73 is determined taking into account the calculated wheel force signal 72, which is calculated based on the distance signal 35, at the time the wheel 16 passes the WIM sensor 2 and/or at the position the WIM sensor 2 is arranged in the road 1.

The wheel spring constant 84 depends on the material the wheel 16 is made of and the dimensions of the wheel 16. This is in most cases a rubber-like material, but other materials may be used as well. Furthermore, the wheel spring constant 84 depends on the temperature of the material. In case of wheels 16 having at least one cavity filled with a gas or a liquid, the wheel spring constant 84 depends on the pressure of the gas or liquid. When determining the wheel spring constant 84, advantageously the material, the dimensions and the temperature of the wheel 16 are determined as well as the velocity dependency.

Depending on the accuracy needed for calibration of the WIM sensor 2, one or more of the described dependencies of the wheel spring constant 84 is or are considered in the calculation of the wheel force signal 72, at least the predetermined pressure of the wheel 12 and the velocity of the vehicle 10.

The wheel spring constant 84 is stored in a wheel spring constant database 89. The wheel spring constant 84 is determined from a wheel spring constant database 89 for a predetermined temperature of the environment. In case of gas filled wheels 12, also the pressure of the gas is predetermined by measuring the pressure prior passing of the WIM sensor 2 by the vehicle 10 and the wheel spring constant 84 is chosen from the wheel spring constant database 89 based on the wheel pressure measured.

The wheel spring constant database 89 may be stored in the non-volatile memory of the evaluation unit 7 in form of a lookup-table for different velocities or in form of a mathematical function. In one preferred embodiment of the method, the velocity signal 50 is used to select the wheel spring constant 84 from a wheel spring constant database 89. This allows calculation of the wheel force 71 with more accuracy than without taking the velocity signal 50 into account. The wheel force 71 is calculated using the wheel spring constant 84 corresponding to the instantaneous velocity of the vehicle.

In a preferred embodiment, the wheel spring constant database 89 holds wheel spring constants for different materials, wheel dimensions, temperature ranges between −50° C. and 150° C., in case of gas filled wheels 12 gas pressures between 500 mbar and 4 bar, and velocity ranges between 0.1 km/h and 300 km/h. This ensures that for each type of vehicle used for the calibration a wheel spring constant matching the wheels of the vehicle can be obtained from the wheel spring constant database. The vehicle may for example be a passenger car or a transporter, a truck or a trailer. Of course, these vehicles have different dimensions of wheels, for example single wheels double wheels or wheels with Super-Single-Tyres.

In one embodiment, the wheel spring constant database 89 includes mathematical functions, which describe the dependency of a spring constant for a wheel 12 with given material and dimensions from the temperature. In case of a gas filled wheel 12, the dependency from a gas pressure may also be included in the mathematical functions. In one embodiment the wheel spring constant database 89 holds wheel spring constants 84 for different materials and wheel 12 dimensions at a predefined temperature, for example 4° C., and, in case of gas filled wheels 12, a predefined gas pressure. The wheel spring constant database 89 also holds mathematical functions to calculate the wheel spring constant 84 for temperature ranges between −50° C. and 150° C., gas pressures between 500 mbar and 20 bar and a velocity range between 0.1 km/h and 300 km/h.

In another embodiment of the method, the wheel constant 84 may be depending on other measurands as well. This renders the calculation of the wheel force 71 straight forward, so that it can be done at the same repetition rate as distance values are provided by the device 3 as the distance signal 35.

In another embodiment, the evaluation unit 7 uses a predetermined number of distance values of the distance signal 35 to generate a mean value of the distance signal 35, and performs the calculation of the wheel force 71 based on the mean value of the distance signal 35. This is advantageous if the distance values are superposed with noise. Of course, the evaluation unit 7 can also employ filtering techniques on the distance signal 35 to minimize a noise superimposed on a distance signal 35 and perform the calculation of the wheel force 71 based on the filtered value of the distance signal 35.

In one embodiment of the method, the velocity signal 50 and a pressure signal 51 is used to select the wheel spring constant 84 from a wheel spring constant database 89. In this embodiment, the pressure inside the wheel 12 is measured continuously while the vehicle 10 passes the WIM sensor 2. This allows taking the actual pressure of the gas inside the wheel 12 into account at the moment of passing the WIM sensor 2 by retrieving the respective wheel spring constant 84 from the wheel spring constant database 89 depending on the measured pressure. Changes of the gas pressure inside the wheel 12 during travel of the vehicle 10 from a starting position to the WIM sensor 2 are considered, resulting in an enhanced accuracy of the calculated wheel force 71.

In one embodiment of the method the velocity signal 50 and a pressure signal 51 and a temperature signal 52 are used to select the wheel spring constant 84 from a wheel spring constant database 89. The temperature signal 52 is referring to the temperature of the wheel 12. The temperature signal 52 is provided to the evaluation unit 7. In this embodiment, the temperature of the wheel 12 is measured continuously while the vehicle 10 passes the WIM sensor 2. This allows taking the actual temperature of the wheel 12 into account at the moment of passing the WIM sensor 2 by retrieving the respective wheel spring constant 84 from the wheel spring constant database 89 depending on the temperature signal 52. Changes of the temperature of the wheel 12 during travel of the vehicle 10 from a starting position to the WIM sensor 2 are considered, resulting in an enhanced accuracy of the calculated wheel force 71 compared to a method only taking the temperature of the wheel 12 at a starting position into account.

In one embodiment of the method, the velocity signal 50 and the pressure signal 51 and the temperature signal 52 and at least one of a tilt signal 53 or an acceleration signal 54 is used to select the wheel spring constant 84 from a wheel spring constant database 89. In this embodiment, the tilt of the device 3 or the acceleration of the device 3 is determined continuously while the vehicle 10 passes the WIM sensor 2. This allows taking the actual the tilt of the device 3 or the acceleration of the device 3 into account at the moment of passing the WIM sensor 2 by retrieving the respective wheel spring constant 84 from the wheel spring constant database 89 depending on the tilt signal 53 or the acceleration signal 54. In this embodiment, the dependence of the wheel spring constant 84 from the tilt of the device 3 or the acceleration of the device 3 is stored in the spring constant database 89. Changes of the tilt of the device 3 will change the distance 34 of the device to the road surface 2 even if the length of the wheel spring element 81 is unchanged. By measuring the tilt of the device 3, this unwanted change of the distance 34 can be corrected. The tilt may be measured in one axis or in two axis axes, corresponding of a rotation of the device around the longitudinal axis X or the lateral axis Y. Acceleration may be positive or negative, a negative acceleration also known as deceleration. An acceleration of the vehicle changes the angle between the body and the road and therefore changing the tilt of the device with respect to the road, resulting in a change of the distance 34 of the device to the road surface 2 even if the length of the wheel spring element 81 is unchanged. The acceleration signal may be used to correct this unwanted change of the distance 34, resulting in an enhanced accuracy of the calculated wheel force 71.

In one embodiment of the method, the calibration function determined in step e) 105 is transferred to a calibration unit 75 and stored in a calibration unit 75 as schematically shown in FIG. 8. The calibration unit 75 is using the calibration function according to step f) 106 to calibrate the WIM signal 21. A calibration function 73 generated using the method described above is preferably used for a WIM sensor. For this, the calibration function 73 is transferred to a calibration unit 75 and stored in a calibration unit 75. The calibration unit calibrates the WIM signal 21 using the calibration function 73. This is beneficial, as it allows using the calibration function 73 on the WIM signal 21 after the calibration of the WIM sensor 2.

For using the method, a system is provided, the system comprising a vehicle, an evaluation unit and a device; the system being configured to be used in the method.

Figure 3:
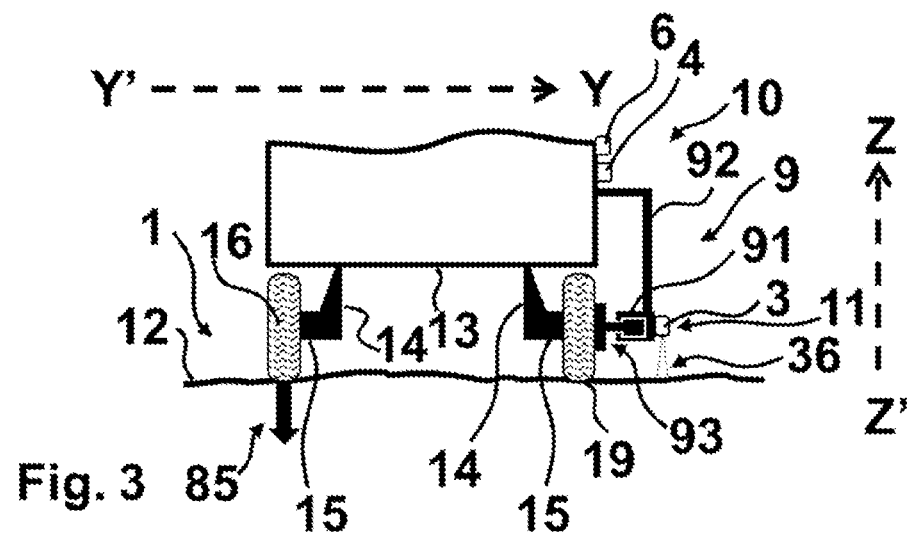

In a currently preferred embodiment of the system the device 3 is arranged at a position 11 of a vehicle 10; the position having a distance 34 to the road surface 12; the device 3 being configured to measure the distance 34 to the road surface 12 continuously; and the device 3 measures the distance 34 to the road surface 12 using a contactless technique, for example utilizing a beam of light 36 or a laser beam 36 or sound 36 as schematically shown in FIG. 3 for example. These contactless methods to determine a distance 34 are advantageous, as the device 3 does not contain any moving parts that are open to wear and the measurement does not hinder the movement of the vehicle 10 due to friction, thus not having an influence on the measurement itself.

Figure 2:
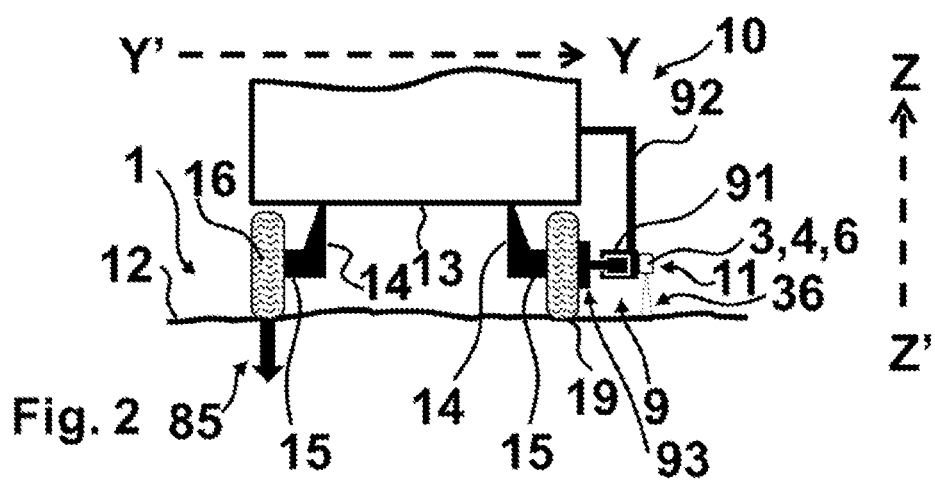
FIG. 2 a representation of a sectional view of a vehicle on a road used for the method to calibrate a WIM sensor in a first embodiment, FIG. 3 a representation of a sectional view of a vehicle on a road used for the method to calibrate a WIM sensor in another embodiment, FIG. 4 a representation of a sectional view of a vehicle on a road used for the method to calibrate a WIM sensor in another embodiment, FIG. 5 a representation of a sectional view of a vehicle on a road used for the method to calibrate a WIM sensor in another embodiment, FIG. 6 a representation of a mass-spring model representing a vehicle of FIG. 5, FIG. 7 a representation of a mass-spring model representing a vehicle of FIG. 2, FIG. 3 and FIG. 4, FIG. 8 a sketch of a top view of a section of a road.
Figure 4:
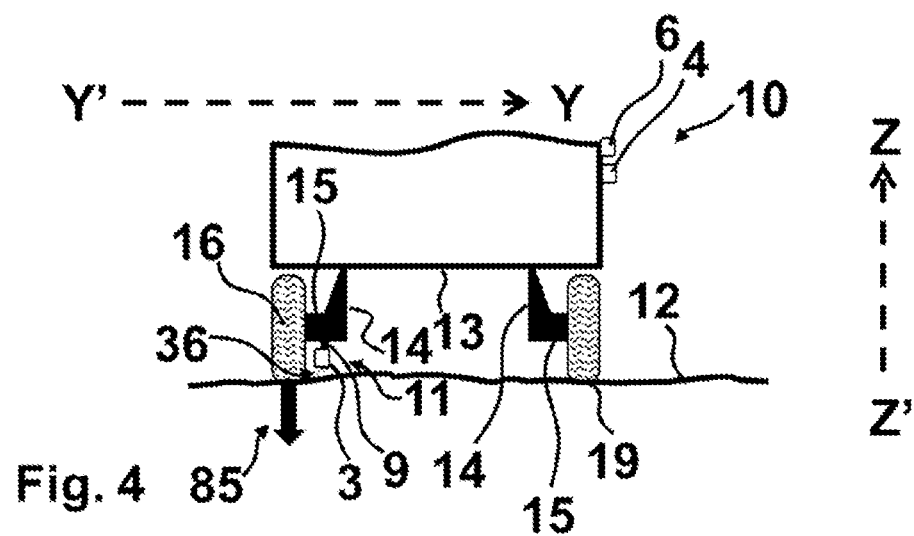
Figure 5:
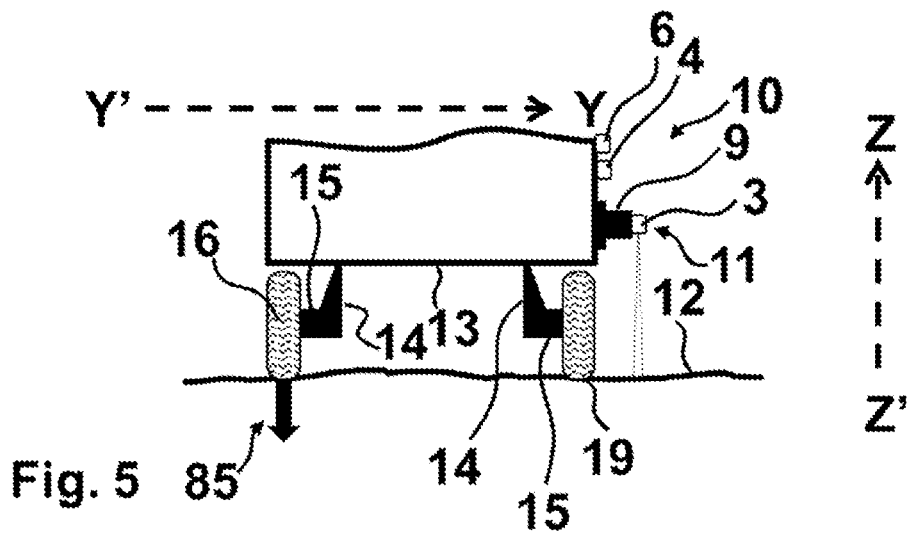

In a currently preferred embodiment the distance 34 of the device (3) arranged at the position (11) to the road surface (12) is independent from the suspension (14) of a vehicle (10). The position (11) is located on an axle (15) of the wheel (16) or on the wheel (16) of the vehicle (10), as shown in FIG. 2, FIG. 3, and FIG. 4. Mounting the device 3 on an axle 15 decouples it from movement of the vehicle 10 body 13. Furthermore, the orientation of the device 3 is maintained. This simplifies the calculation of the calculated wheel force 71 as the distance signal 35 does only depend on the wheel spring constant 84 and is independent from the suspension spring constant 86 as shown in FIG. 7.

In one embodiment schematically shown in FIGS. 2-5 for example, the device 3 is connected to the wheel 16 of the vehicle 10 by a connection element 9. The connection element 9 is connected to the wheel 16 by force closure or adhesive bond or form closure. The connection element 9 is connected to the device 3 by force closure or adhesive bond or form closure. The connection element 9 comprises a bearing 91. The bearing 91 is configured to decouple the rotation of the wheel 16 from the device 3. The bearing 91 is configured to couple the movement of the wheel 16 along the vertical direction Z relative to the road surface 12 to the device 3. The device 3 is aligned to measure the distance 34 to the road surface 12 and the alignment is maintained through an alignment element 92, which is schematically shown in FIG. 3 for example and configured for aligning the device 3 to the underbody 13 of the vehicle 10. The device 3 is connected to the wheel 16, if mounting the device 3 on the axle 15 is not possible due to space issues. However, mounting the device 3 at the wheel 16 is very straightforward, as the device 3 can be clipped on the wheel 16 like a hubcap or attached to existing bolts of the wheel 16 or glued to the wheel 16 with an attachment element 93. As the attachment element 93 rotates with the wheel 16, the device 3 is uncoupled from the rotation by a bearing 91. The bearing 91 can perform a rotation around one axis perpendicular to the wheel 16 but does not allow movement along any axis or rotation around other axis than the one perpendicular to the wheel 16. In order to prevent the device 3 from rotating or oscillation movement around the axis perpendicular to the wheel 16, the device 3 is stabilized in its orientation by an alignment element 92. The aligning element 92 is attached to the body 13 of the vehicle 10 and aligns the device 3 in a fixed orientation to the underbody 13 of the vehicle 10. The alignment element 92 may be attached to the body 13 of the vehicle 10 by vacuum cup or other adhesive elements or form closure. The alignment element 92 may have a telescopic behaviour to compensate a change in distance of the body 13 to the wheel 16, for example when the suspension 14 is deformed. Furthermore, the alignment element 92 may have at least one degree of freedom for a rotation about at least one axis to compensate for a movement of a front wheel 16 while driving along a curve if the device is arranged at a front wheel 16 or to compensate for an angled movement between the body 13 and the wheel 16.

In a currently preferred embodiment of the system schematically shown in FIG. 2, a synchronization device 6 is arranged at the device 3 and the WIM sensor 2. In another embodiment of the system schematically shown in FIG. 9, a synchronization device 6 is arranged in the evaluation unit 7. The synchronization device 6 provides a synchronization signal 61 to the evaluation unit 7. This means that the distance signal 35 and the WIM Signal is synchronized with respect to time or location in the evaluation unit 7 with a synchronization signal 61. The evaluation unit synchronizes the WIM signal 21 and the distance signal 35 to ensure that the calculated wheel force 71 used to calibrate the WIM sensor 2 is corresponding to the position of the WIM sensor 2 or the time the wheel 16 passes the WIM sensor 2. This is advantageous as it is ensured that the correct calculated wheel force signal 72 is used to calibrate the WIM sensor 2.

Said synchronization device 6 is a GPS transducer and the synchronization signal (61) includes at least one of a time signal (61) and a location signal (61).

In case of synchronization through a time signal, the synchronization device 6 may be a GPS sensor 6 and accordingly may determine a GPS time signal 61 from the GPS signal.

Of course, the synchronization device 6 may in another embodiment be a radio controlled clock determining a radio time signal 61.

In case of synchronization through a location, the synchronization device 6 may be a GPS sensor 6 determining a GPS location signal 61 from the GPS signal.

In one embodiment schematically shown in FIG. 9, the synchronization device 6 might also be arranged in the evaluation unit 7, synchronizing the distance signal 35 and the WIM signal 21 as they are provided to the evaluation unit 7. This is especially beneficial, as only one synchronization device is needed. It has to be ensured, that the difference in the span of time for providing the WIM signal 21 and the distance signal 35 to the evaluation unit after measurement is at least less than 100 ms, preferably 5 ms, to ensure the WIM signal 21 and the distance signal 35 are synchronized in the evaluation unit.

In one embodiment of the system, one of said sensor 4 in step b) is a pressure sensor 4 arranged at the wheel 16; and that the pressure sensor measures the pressure inside the wheel 16 as a pressure signal 51 and provides a pressure signal 51 to the evaluation unit 7. This embodiment allows the wheel pressure to be determined at the time the wheel 16 passes the WIM sensor 2 and is taken into account for the calculation of the calculated wheel force 71.

In one embodiment of the system, one of said sensor 4 in step b) 102 is a temperature sensor 4 arranged at the wheel 16; and that the temperature sensor 4 measures the temperature of the wheel 16 as a temperature signal 52; and that the temperature signal 52 is provided to the evaluation unit 7. This embodiment allows the wheel temperature to be determined at the time the wheel 16 passes the WIM sensor 2 and is taken into account for the calculation of the calculated wheel force 71.

In one embodiment of the system, one of said sensor 4 in step b) 102 is at least one of a tilt sensor 4 measuring a tilt signal 53 and providing it to the evaluation unit 7 or an acceleration sensor 4 measuring an acceleration signal and providing it to the evaluation unit 7. This embodiment allows the tilt of the device 3 or the acceleration of the vehicle 10 to be determined at the time the wheel 16 passes the WIM sensor 2 and is taken into account for the calculation of the calculated wheel force 71.

In one embodiment of the system, the evaluation unit 7 in step b) 102 is arranged inside or at the vehicle 10, as shown in FIG. 8. This is beneficial, as no additional place has to be prepared close to the road to arrange the evaluation unit 7 at.

In one embodiment of the method, at least one of a velocity signal 50 or a temperature signal 52 or a pressure signal 51 or an acceleration signal 54 or a tilt signal 53 is transmitted contactless to the evaluating unit 7; and the distance signal 35 and the WIM signal 21 are transmitted contactless to the evaluating unit 7. This embodiment allows for more flexibility in the positioning of the evaluation unit 7 and is achieved if distance signal 35 and WIM signal 21 are transmitted contactless to the evaluation unit 7.

In a currently preferred embodiment the evaluation unit 7 is arranged in or at the vehicle 10. In this embodiment, at least the WIM signal 21 is transmitted contactless to the evaluation unit 7. If in another embodiment the evaluation unit 7 is not arranged in or at the vehicle 10 but remains stationary, at least the distance signal 35 is transmitted contactless to the evaluation unit 7.

A preferred way of contactless transmission of a signal is via electromagnetic waves, preferably electromagnetic waves within the ISM band. The ISM band is a frequency band used for high frequency devices in medicine, industry and home use and similar fields. In general, ISM bands are used for audio or video or data transmission. The signals are transmitted for example via wireless local area network (wireless LAN) or Bluetooth. ISM band includes several frequency ranges in between 6.765 MHz and 246 GHz.

It is understood that the different aspects and embodiments of the invention can be combined where possible and embodiments resulting from such a combination of embodiments described above are part of the invention as well.

LIST OF REFERENCE SYMBOLS 1 road
2 WIM sensor 3 device
4 sensor/pressure sensor/
6 synchronization device
7 evaluation unit
9 connection element
10 vehicle
11 position
12 road surface
13 underbody/body
14 suspension
15 axle
16 wheel
18 spring element
19 contact area
21 WIM signal
34 distance
35 distance signal
36 beam of light/laser beam/sound
42 system
50 velocity signal
51 pressure signal
52 temperature signal
53 tilt signal
54 acceleration signal
61 synchronization signal/time signal/location signal
71 calculated wheel force
72 calculated wheel force signal
73 calibration function
74 calibrated WIM force signal
75 calibration unit
81 wheel spring element
82 suspension spring element
84 wheel spring constant
85 force/wheel force
86 suspension spring constant
89 spring constant database
91 bearing
92 alignment element
93 attachment element
101 step a)
102 step b)
103 step c)
104 step d)
105 step e)
106 step f)
X longitudinal direction
X'X longitudinal axis
Y lateral direction
Y'Y lateral axis
Z vertical direction
Z'Z vertical axis

The invention claimed is:

1. Method to calibrate a WIM (Weigh in Motion) sensor; which WIM sensor is arranged in a road flush with a road surface; which WIM sensor determines a force exerted on the road surface of the road; wherein the following steps are performed:
   a) a device is arranged at a position of a vehicle wherein the position having a distance to the road surface; the device being configured to measure the distance to the road surface continuously; the device providing a distance signal to an evaluation unit;
   b) a wheel of the vehicle passes over the WIM sensor, the wheel exerting a force on the road surface and the WIM sensor; the vehicle being equipped with at least one sensor arranged at the vehicle; said at least one sensor is configured to measure the velocity of the vehicle as a velocity signal and providing a velocity signal to the evaluation unit;
   c) the evaluation unit uses the velocity signal, a wheel spring constant, a suspension spring constant, and the distance signal to calculate a wheel force exerted on the road surface continuously and provides the calculated wheel force as a calculated wheel force signal, wherein the wheel force is calculated by a function of the type $F=(k1^{-1}+k2^{-1})^{-1}(z1-z0)+c$, wherein the calculated wheel force is F, the distance between the first device and the road surface is $(z1-z0)$, the wheel spring constant is k1, the suspension spring constant is k2 and a constant value is c;
   d) the WIM sensor provides a WIM signal to the evaluation unit as the vehicle passes over the WIM sensor;
   e) the evaluation unit uses the calculated wheel force signal and the WIM signal to determine a calibration function; and
   f) the calibration function is used for the calibration of the WIM sensor.

2. Method according to claim 1, wherein the distance signal and the WIM signal in step e) are synchronized with respect to at least one of a time location of the wheel; and that said time or said location of the wheel are provided to the evaluation unit as a synchronization signal.

3. Method according to claim 2, wherein the velocity signal is used to select the wheel spring constant from a wheel spring constant database; or that the velocity signal and a pressure signal is used to select the wheel spring constant from a wheel spring constant database; or that the velocity signal and a pressure signal and a temperature signal are used to select the wheel spring constant from a wheel spring constant database; or that the velocity signal and a pressure signal and the temperature signal and at least one of a tilt signal or an acceleration signal is used to select the wheel spring constant from a wheel spring constant database.

4. System for calibrating a Weigh-In-Motion (WIM) sensor that is arranged in a road flush with a road surface and configured for determining a force exerted on the road surface by a vehicle's wheel transgressing the WIM sensor, the system comprising:
   a vehicle that includes an underbody, a suspension, an axle coupled to the suspension and a wheel carried by the axle;
   an evaluation unit configured for communicating with the WIM sensor and for determining a calibration function for the WIM sensor;
   a first device arranged at a fixed position of the vehicle and being configured to measure continuously the distance between the first device and the road surface and accordingly generate a continuous stream of distance signals, wherein the first device is configured to measure the distance between the first device and the road surface using a contactless technique, and wherein the first device is configured to transmit the continuous stream of distance signals to the evaluation unit;
   wherein the distance between the first device and the road surface is independent from the suspension of the vehicle;
   wherein the fixed position is located on the axle of the wheel or on the wheel of the vehicle;
   wherein the first device is connected to the wheel by a connection element;

wherein the connection element includes a bearing that is configured to decouple the rotation of the wheel from the first device;
wherein the bearing is configured to couple the movement of the wheel along a vertical direction relative to the road surface in an alignment to the first device;
wherein the connection element includes a force closure or adhesive bond or form closure that is connected to the first device; and
wherein the alignment is maintained through an alignment element that is configured for aligning the first device to the underbody of the vehicle.

5. System according to claim 4, further comprising a synchronization device that is configured to generate a synchronization signal when the first device is synchronized with the WIM sensor, wherein the synchronization device is arranged at the first device or wherein the synchronization device is arranged in the evaluation unit; and wherein the synchronization device is configured to provide the synchronization signal to the evaluation unit.

6. System according to claim 5, wherein said synchronization device is a GPS transducer and the synchronization signal includes at least one of a time signal and a location signal.

7. System according to claim 4, further comprising a pressure sensor arranged at the wheel and configured to measure a pressure inside the wheel and accordingly generate a pressure signal that is transmitted to the evaluation unit.

8. System according to claim 7, wherein the pressure sensor is configured so that a pressure signal is transmitted contactless to the evaluating unit; wherein the distance signal and the WIM signal are transmitted contactless to the evaluating unit; and wherein the evaluation unit in step b) is arranged inside or at the vehicle.

9. System as in claim 4, wherein contactless technique uses a beam of visible light or a laser beam or sound.

10. System according to claim 4 further comprising a temperature sensor arranged at the wheel and configured to measure a temperature inside the wheel and accordingly generate a temperature signal that is transmitted contactless to the evaluation unit; wherein the distance signal and the WIM signal are transmitted contactless to the evaluating unit; and wherein the evaluation unit in step b) is arranged inside or at the vehicle.

11. System according to claim 4 further comprising a tilt sensor arranged at the wheel and configured to measure the degree to which the wheel is tilted with respect to a vertical axis and accordingly generate a tilt signal that is transmitted contactless to the evaluation unit; wherein the distance signal and the WIM signal are transmitted contactless to the evaluating unit; and wherein the evaluation unit in step b) is arranged inside or at the vehicle.

12. System according to claim 4 further comprising an acceleration sensor arranged at the wheel and configured to measure the degree to which the wheel is undergoing an acceleration with respect to the road surface and accordingly generate an acceleration signal that is transmitted contactless to the evaluation unit; wherein the distance signal and the WIM signal are transmitted contactless to the evaluating unit; and wherein the evaluation unit in step b) is arranged inside or at the vehicle.

13. A method to calibrate a Weigh in Motion (WIM) sensor that is arranged in a road flush with a road surface for determining a force exerted on the road surface by a vehicle's wheel transgressing the WIM sensor, the method comprising the following steps:
  a) arranging at a first fixed position of the vehicle, a first device configured to measure continuously the distance between the first device and the road surface and accordingly provide a distance signal to an evaluation unit;
  b) providing to the evaluation unit a velocity signal generated by a velocity sensor that has been disposed at a second fixed position of the vehicle, wherein the velocity sensor is configured to measure the velocity of the vehicle as the vehicle's wheel is transgressing over the WIM sensor and the vehicle's wheel is exerting a force on the road surface and the WIM sensor;
  c) using the evaluation unit to calculate continuously from the velocity signal, a wheel spring constant, a suspension spring constant, and the distance signal, a wheel force exerted on the road surface and accordingly generate a calculated wheel force signal, wherein the wheel force is calculated by a function of the type $F=(k1^{-1}+k2^{-1})^{-1}$ $(z1-z0)+c$, wherein the calculated wheel force is F, the distance between the first device and the road surface is $(z1-z0)$, the wheel spring constant is k1, the suspension spring constant is k2 and a constant value is c;
  d) as the vehicle's wheel passes over the WIM sensor, generating from the WIM sensor a WIM signal that is provided to the evaluation unit;
  e) using the evaluation unit to determine a calibration function from the correspondence between the calculated wheel force signal and the WIM signal; and
  f) using the calibration function for the calibration of the WIM sensor.

14. Method according to claim 13, wherein in step f) the calibration function is transferred to a calibration unit and stored in the calibration unit; and wherein the calibration unit is using the calibration function to calibrate the WIM signal.

* * * * *